United States Patent [19]

Liu et al.

[11] Patent Number: 5,139,548
[45] Date of Patent: Aug. 18, 1992

[54] GAS LIQUEFACTION PROCESS CONTROL SYSTEM

[75] Inventors: Yu-Nan Liu, Emmaus; Glenn E. Kinard, Allentown; David A. Zagnoli, Macungie, all of Pa.

[73] Assignee: Air Products and Chemicals, Inc., Allentown, Pa.

[21] Appl. No.: 739,077

[22] Filed: Jul. 31, 1991

[51] Int. Cl.⁵ ................................................. F25J 3/02
[52] U.S. Cl. ........................................ 62/24; 60/39.12; 62/37; 62/40; 364/501
[58] Field of Search ............... 62/24, 37, 40; 364/501; 60/39.12

[56] References Cited

U.S. PATENT DOCUMENTS

| | | | |
|---|---|---|---|
| 3,742,721 | 7/1973 | Bourguet et al. | 62/37 |
| 4,457,768 | 7/1984 | Bellinger | 62/21 |
| 4,498,916 | 2/1985 | Jensen | 62/37 |
| 4,734,114 | 3/1988 | Tasaka et al. | 62/37 |
| 4,746,407 | 5/1988 | Olsen | 62/37 |
| 4,809,154 | 2/1989 | Newton | 364/148 |

FOREIGN PATENT DOCUMENTS

| | | |
|---|---|---|
| 1043442 | 9/1983 | U.S.S.R. |
| 1354007 | 11/1987 | U.S.S.R. |
| 1357662 | 12/1987 | U.S.S.R. |
| 1458663 | 2/1989 | U.S.S.R. |

OTHER PUBLICATIONS

Bill G. Tompkins, LNG Plant Computer System: a Conceptual Philosophy. pp. 56-60.

Primary Examiner—Ronald C. Capossela
Attorney, Agent, or Firm—John M. Fernbacher; James C. Simmons; William F. Marsh

[57] ABSTRACT

A method for controlling the operation of a liquefied natural gas (LNG) process which utilizes gas turbine-driven refrigeration compressors is disclosed. A feedforward control system compensates for the effects of changes in ambient air temperature on the plant operating efficiency by periodically predicting a new temperature and resetting the set points of key feedback controllers in anticipation of this new temperature, thereby optimizing the operation of the plant and minimizing the specific fuel consumption at a given LNG production rate.

36 Claims, 3 Drawing Sheets

GAS LIQUEFACTION PROCESS CONTROL SYSTEM

FIELD OF THE INVENTION

The present invention pertains to the liquefaction of gases, and in particular to a method for controlling the operation of a natural gas liquefaction process.

BACKGROUND OF THE INVENTION

Natural gas liquefaction is practiced at remote natural gas-rich locations to convert the gas to a transportable liquid for shipment to markets in energy-poor areas. It is desirable to minimize the specific energy consumption for producing liquefied natural gas (LNG) in order to reduce the final product cost and/or increase the profitability of LNG production. Alternately, it becomes necessary at certain times to maximize LNG production while consuming the least amount of energy possible at maximum production rates. The liquefaction of natural gas at cryogenic temperatures requires one or more energy-intensive refrigeration systems, and the proper control of such refrigeration systems is critical to minimize energy consumption or maximize the amount of LNG produced.

Feedback control systems are widely used to achieve efficient operation of LNG plants by controlling the perturbations normally encountered in the operation of such large and complex process plants. Such perturbations occur for example due to upsets in the operation of certain equipment in the plant, adjustments of operating conditions by plant operators, changes in production rates, and the like. In these feedback control systems, a plurality of parameters including pressure, temperature, flow rate, composition, and liquid level at specific locations in the process are controlled at desired set points by measuring each parameter, determining the deviation of each parameter from its set point, and using the value of the deviation to control a piece of equipment (for example a valve) at a location elsewhere in the process in order to minimize the deviation of each measured parameter from its set point. The specific hardware and software utilized in such feedback control systems are well known in the field of process plant control, see for example Chemical Engineers' Handbook, Fifth Edition, McGraw-Hill, pp. 22-1 to 22-147.

U.S. Pat. No. 3,742,721 discloses a control method for a gas liquefaction process in which the temperature on the refrigerant side of the main liquefaction heat exchanger is controlled by adding appropriate amounts of makeup refrigerant to the recirculating refrigerant stream. In addition, the pressure at the same location is controlled by regulating the speed of the refrigerant compressor. Other feedback control loops controlling temperatures, pressures, and liquid levels are also described.

The basic concepts of operating an LNG plant computer control system is described in an article by B. G. Tompkins entitled "LNG Plant Computer System: a Conceptual Philosophy" in the Oil and Gas Journal. pp.57-60, Nov. 26, 1979. The author covers the important factors in designing such a system and reviews the various types of hardware and software which can be utilized in the system.

U.S. Pat. No. 4,457,768 discloses the control of a refrigeration process used to liquefy natural gas in which the liquid level in one or more refrigerant flash drums is maintained by controlling the rate(s) of liquid flow from the drum(s). The liquid refrigerant level in the main liquefaction heat exchanger is maintained by regulating the flow rate of the recirculating refrigerant across a pressure letdown valve.

A series of Soviet Union patents SU 1,043,442, 1,354,007, 1,357,662, and 1,458,663 disclose various feedback control systems for operating LNG plants including loops for controlling flow rates, liquid levels, pressures, temperature differentials, and actual temperatures.

An automated control system for a multicomponent refrigeration system used for liquefaction of natural gas is disclosed in U.S. Pat. No. 4,809,154. The system includes a plurality of sensors for detecting various conditions in the plant such as temperature, pressure, flow, and composition, a plurality of controllers such as servo-controlled valves, and a computer for executing the control program. The control system operates the plant to provide the desired production rate with the highest possible efficiency, or maximizes the production rate while attaining the highest possible efficiency at that production rate. The control system responds to changes in plant conditions and then adjusts various pieces of equipment to eliminate excursions from desired controller set points; the control system therefore operates in a feedback mode.

Many LNG plants are located at remote sites where the refrigerant compressors are driven by steam turbines using steam generated onsite or by gas turbines fired with a portion of the plant feed gas and/or product gas. Gas turbines are preferred over steam turbines in many locations for their potential lower overall cost. Gas turbines have the disadvantage, however, that power output can be affected by ambient air temperature. An increase in ambient temperature has two potential effects on LNG plant performance: (1) if the turbine is not operating at maximum available power, an increase in the fuel rate to the turbine combustor is required to provide the necessary power to maintain LNG production; or (2) if the turbine is operating at maximum available power, the turbine power output will decrease and LNG production will likewise decrease. A drop in the ambient temperature typically causes the opposite response wherein the gas turbine available power output increases. In addition, when the plant site requires the use of ambient air cooling for refrigerant compressor intercooling and aftercooling, the heat rejection from the refrigeration system is reduced when ambient temperature rises, which in turn reduces the amount of available refrigeration for gas liquefaction.

Since ambient air temperature usually cycles through a minimum and a maximum each day, or can be subject to wide swings due to severe weather changes, the optimization of a gas liquefaction process is not possible using the various feedback control systems described in the background references cited above. The invention disclosed in the following specification and defined in the appended claims solves this problem and allows the optimum operation of an LNG plant during dynamic ambient temperature changes at the plant site.

SUMMARY OF THE INVENTION

The present invention is a method of operating a gas liquefaction process wherein a feed gas is liquefied in a liquefaction system by indirect heat exchange with at least one refrigerant provided by a refrigeration system which utilizes at least one gas turbine-driven compressor and wherein the refrigeration system utilizes at least one feedback control loop. The method comprises the steps of:

(a) determining the ambient air temperature at the location of the liquefaction process at a given time;

(b) determining the optimum operating conditions of the liquefaction process including the set point of the feedback control loop at the given time, and operating the liquefaction process at the optimum operating conditions including the set point of the feedback control loop;

(c) predicting the ambient air temperature at a future time;

(d) determining new optimum operating conditions of the liquefaction process including a new set point of the feedback control loop at the future time, and changing the optimum operating conditions to the new optimum operating conditions including changing the set point to the new set point;

(e) operating the liquefaction process at the new optimum operating conditions including the new set point; and (f) repeating steps (a), (c), (d), and (e) at a time interval defined by the time difference between the given time and the future time.

These steps provide a feedforward control method for the operation of the liquefaction process which anticipates changes in ambient air temperature in order to maintain optimum operating conditions for the process.

The optimum operating conditions can be selected to minimize the specific fuel consumption required to liquefy the feed gas, or alternately to maintain the liquefaction rate of the feed gas while minimizing the specific fuel consumption at this feed rate.

The prediction of the ambient temperature at a selected future time can be accomplished by utilizing the daily weather forecast at the site of the liquefaction plant, or can be predicted by the extrapolation of regularly repeated ambient air temperature measurements made prior to and at each given time.

The invention also comprises a system consisting of the necessary elements for accomplishing steps (a) through (f) described above, including a supervisory control system to optimize process operating conditions and reset the set points of one or more feedback control loops in the liquefaction and refrigeration systems.

DETAILED DESCRIPTION OF THE INVENTION

The control system of the present invention can be applied to any gas liquefaction process which utilizes one or more gas turbine-driven compressors in the refrigeration systems which precool and liquefy the feed gas. The feed gas is typically natural gas which is liquefied at remote sites for transportation to distant markets. A representative liquefaction process and associated feedback control system is described in the earlier-cited U.S. Pat. No. 4,809,154 which is incorporated herein by reference.

Figure 1:
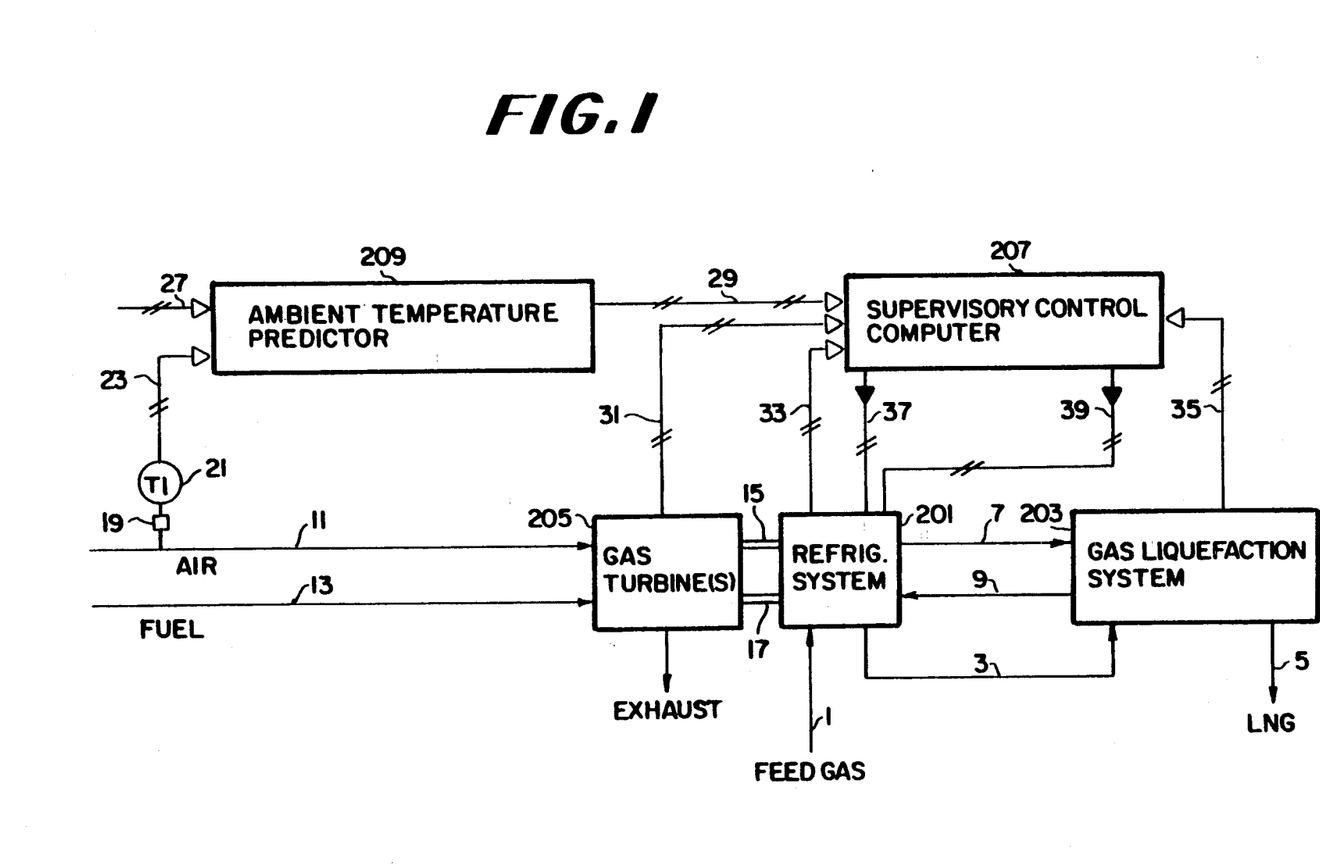
FIG. 1 is a simplified schematic block diagram for the process of the present invention.

Referring now to FIG. 1, a previously dried and pressurized natural gas feedstream 1, at ambient temperature and at a pressure between about 300 and 1700 psig, flows into refrigeration system 201 wherein the feedstream is cooled by indirect heat exchange against a first vaporizing refrigerant provided by a closed loop refrigeration system of a type known in the art; one such system is described in FIG. 1 of earlier-cited U.S. Pat. No. 4,809,154. A similar system is described in U.S. Pat. No. 3,763,658 which is incorporated herein by reference. Refrigerants for this system can be selected from ammonia, nitrogen, methane, ethane, ethylene, propane, propylene, butane, and mixtures thereof. Cooled feed gas between about $-10°$ F. and $-80°$ F. flows through line 3 and into gas liquefaction system 203, where the stream is further cooled and liquefied by indirect heat exchange with vaporizing refrigerant as described in more detail below. Final liquefied gas product stream 5 is withdrawn from gas liquefaction system 203 at a typical pressure between about 0.5 and 5 psig and a temperature between about $-255°$ and $-265°$ F. Refrigerant stream 7, which can comprise one or more refrigerant streams from refrigeration system 201, is warmed and vaporized in liquefaction system 203 thereby liquefying the feed gas; the vaporized refrigerant stream 9 is returned to refrigeration system 201 where it is compressed, cooled, partially liquefied, and returned as refrigerant 7 to gas liquefaction system 203. Refrigeration system 201 utilizes one or more centrifugal and/or axial compressors driven by representative shafts 15 and 17 of gas turbine system 205 in which air 11 and fuel 13 are combusted to generate the shaft work to drive the refrigerant compressors.

The term specific power as used herein is defined as the unit shaft horsepower of the gas turbine(s) per unit production rate of liquefied gas product. The term specific fuel consumption is defined as the unit amount of fuel fired to the gas turbine(s) per unit production of liquefied gas product. The term maximum available power is defined as the power output of the turbine when operating at the maximum allowable exhaust temperature for a given set of ambient conditions. In general, when specific power increases, specific fuel consumption also increases; when specific power decreases, specific fuel consumption also decreases. When an LNG plant is operating at optimum steady state conditions, an increase in ambient temperature will increase both specific power and specific fuel consumption; this increase can be minimized by appropriate process control strategies as described in the present invention. Thus the overall objective of the present invention is to minimize the integrated specific fuel consumption for a given set of production requirements as the ambient temperature varies both diurnally and seasonally.

Feedback control systems are widely used in the chemical and petroleum process industries to achieve efficient plant operation for controlling the perturbations normally encountered in the operation of such large and complex process plants. Such perturbations occur for example due to upsets in the operation of certain equipment in the plant, operational changes by plant operators, changes in feedstream properties, changes in ambient conditions, and the like. In such feedback control systems, a plurality of parameters including pressure, temperature, flow rate, composition and liquid level at specific locations in the process are controlled at desired set points by measuring each parameter, determining the deviation of each parameter from its set point, and using the value of the deviation to control a piece of equipment (for example a valve) at a location elsewhere in the process in order to minimize the deviation of each measured parameter from its set point. The specific hardware and software utilized in such feedback control systems are well known in the field of process plant control; see for example Chemical Engineers' Handbook. Fifth Edition, McGraw-Hill, pp. 22-1 to 22-147.

Feedback control is widely utilized in the operation of LNG plants and typical control systems for this purpose are described in detail in the earlier-cited U.S. Pat. No. 4,809,154. Operation of gas turbine system 205 is also known in the art and may include one or more feedback control elements. Such feedback control methods allow highly efficient steady-state operation of energy-intensive LNG plants by responding to variability and moderate upsets within the plant.

In the operation of an LNG plant in which the refrigeration compressors are driven by gas turbines, the ambient air temperature is an external variable which has a major impact on the optimum performance of the process. The nature of this impact depends upon the operating conditions of the turbine at the time of the change in air temperature. First, if the turbine is delivering less than its maximum available power and the ambient air temperature rises, the firing rate to the turbine combustor must be increased to maintain the power output and corresponding LNG production rate. This therefore increases the specific fuel consumption at this production rate if all control systems in the plant operate at fixed set points. Second, if the turbine is delivering its maximum available power and the ambient air temperature rises, the turbine power output will decrease since additional firing is not possible. This in turn will reduce the power to the refrigeration compressor, which reduces available refrigeration and thus reduces LNG production if all control systems in the plant operate at fixed set points. This change in turbine power output also may affect the compressor speed and reduce compressor efficiency. The net effect of an increase in ambient air temperature is a decrease in LNG production and an increase in specific fuel consumption. A drop in the ambient temperature causes the opposite response wherein the gas turbine power output typically increases. An additional effect on plant performance occurs when a plant site requires the use of ambient air cooling for refrigerant compressor intercooling and aftercooling—an increase in ambient temperature reduces heat rejection from the refrigeration system which in turn reduces the amount of available refrigeration and thus reduces LNG production.

Because of the complex interrelationship of the operating variables in an LNG plant and the continuously changing ambient air temperature, the typical feedback control systems cannot respond completely to the unsteady state conditions caused by changes in ambient air temperature. Thus the plant performance cannot be optimized to achieve minimum specific fuel consumption for a given LNG production rate when ambient temperature varies. The present invention solves this problem by utilizing a feedforward control system which anticipates the dynamic variation in ambient air temperature and changes the set point(s) of one or more feedback control loops within the refrigeration, liquefaction, and/or gas turbine systems in order to control the compressor and refrigeration system operation to achieve the minimum integrated specific fuel consumption over a given period of time as the ambient temperature rises and falls in diurnal cycles. Referring again to FIG. 1, the temperature of air inlet stream 11 of gas turbine system 205 (which is the same as the ambient air temperature) is determined at a given time by temperature measurement means 19, converted by temperature indicator/transmitter 21 into signal 23, and sent to ambient temperature predictor 209. Ambient temperature predictor 209 typically is a computer system which utilizes one or more algorithms to predict the ambient air temperature at a future time and which transmits the present and predicted future temperatures as multiplexed signal 29 to supervisory control computer 207. Ambient temperature predictor 209 is shown here as a separate element but alternately can be included as an element within supervisory control computer 207. The prediction of a future ambient temperature is repeated once every 2 to 60 minutes, depending upon the dynamic response times of refrigeration system 201, liquefaction system 203, and gas turbine system 205, or other criteria. Typically a future air temperature will be predicted approximately every 15 minutes.

Figure 2:
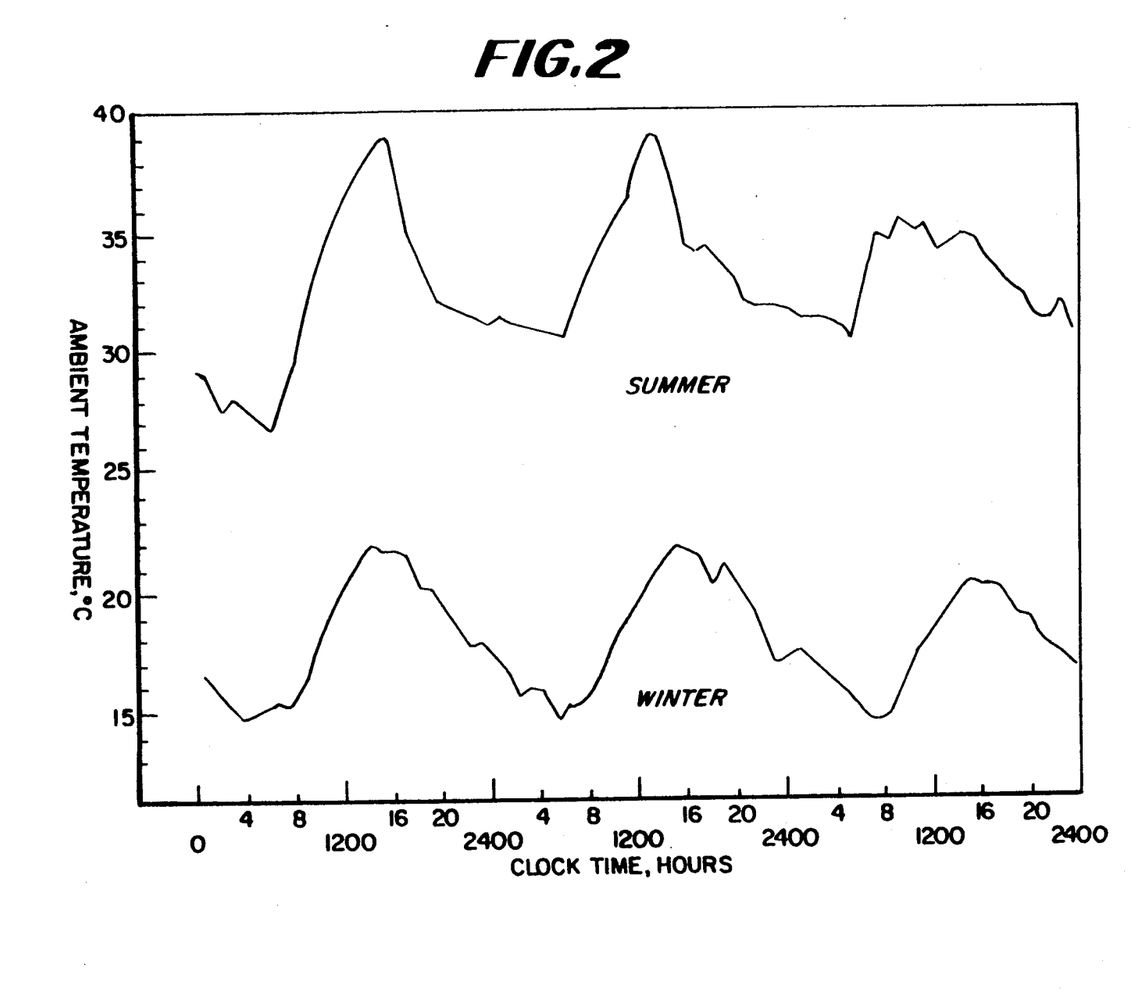
FIG. 2 is a plot of ambient temperature vs time at an actual gas liquefaction plant site.

The ambient temperature predictor can operate in one of two modes. First, ambient temperature can be predicted based on daily weather forecasts and/or long-term averages of daily temperature swings at the plant site, and such information is entered as representative signal 27. FIG. 2 illustrates actual temperature swings over three-day periods in summer and winter at an operating LNG plant; similar data averaged over longer periods of time can be entered and stored in ambient temperature predictor 209 for use in temperature predictions. Alternately, special temperature information for rainy, stormy, or otherwise unusual weather can be entered based on the judgement of plant operators. In the second mode of operation, a future ambient air temperature can be predicted by the extrapolation of regularly repeated air temperature measurements made prior to and at a given time using an appropriate algorithm in ambient temperature predictor 209. Once predicted, a future ambient temperature is sent as signal 29 to supervisory control computer 207.

Supervisory control computer 207 can be any one of several types described in *Encyclopedia of Chemical Technology*, Vol 13, 1981, Wiley Interscience, New York, p. 490 et seq. The present invention may utilize a type of secondary control loop external to the feedback control loops which operate within refrigeration system 201, gas liquefaction system 203, and/or gas turbine system 205. This type of supervisory control system responds to change(s) in one or more external variables and resets one or more of the internal feedback control set points to achieve the desired control of the operating process. Alternately, the present invention may utilize a second type of supervisory control system, namely a direct digital control system, which performs both the external control function as well as the individual feedback control functions, thus eliminating the numerous feedback control units operating within refrigeration system 201, gas liquefaction system 203, and/or gas turbine system 205. The following discussion of the present invention utilizes the first type of supervisory control system, although the second type may be utilized as an alternative.

Operation of supervisory control computer 207 requires information on the dynamic operating characteristics of refrigeration system 201, gas liquefaction system 203, and gas turbine system 205 in order to determine new feedback control set points in response to the external variable of ambient air temperature. These dynamic operating characteristics can be determined by two alternate methods. First, a dynamic process model of the entire liquefaction process can be prepared by known methods and included as an element within supervisory control computer 207; the key feedback control set points then can be determined in real time for any given combination of ambient air temperature and process variables. The dynamic process model may be modified or tuned when necessary using actual plant operating experience. A future ambient air temperature is predicted as discussed above and entered into supervisory control computer 207, and the required set point(s) are determined for the one or more feedback controllers which control the liquefaction process at the desired optimum conditions. In order to determine these new set points, the appropriate process variables are measured in refrigeration system 201, gas liquefaction system 203, and gas turbine system 205, the measurements are converted into representative signals 31, 33, and 35 respectively, and the signals are entered along with signal 29 into supervisory control computer 207. Supervisory control computer 27 then utilizes these process variables with the predicted future ambient air temperature (proportional to signal 29) in the process model to determine optimum operating conditions and new set points. The new key feedback control set points are then transmitted to refrigeration system 201 and/or gas liquefaction system 203 as representative output signals 37 and/or 39 which reset the corresponding feedback control set points to optimize the overall gas liquefaction process performance in anticipation of the new ambient air temperature. Optionally, set point(s) on feedback controller(s) in gas turbine system 205 can be changed as well in a similar manner.

A second method can be used in supervisory control computer 207 to determine new set points for the key feedback controllers in anticipation of a changed ambient air temperature. In this method, the entire liquefaction process is modelled using an external process simulation system, and the appropriate feedback control set points then are predicted in tabular form for all necessary combinations of ambient air temperatures and liquefaction process operating variables. The process simulation system may be modified or tuned as necessary using actual plant operating experience. The tabular data are stored in supervisory control computer 207 which then retrieves the appropriate new feedback controller set points based on a predicted future ambient air temperature and the liquefaction process variables determined as above and transmitted as representative signals 31, 33, and 35 to supervisory control computer 207. These new set points are transmitted back to the liquefaction process as described above thus controlling the optimum performance of the liquefaction process in anticipation of a future change in ambient air temperature. Alternately, the tabular data can be prepared by analysis of actual plant operating data for the gas liquefaction process.

Figure 3:
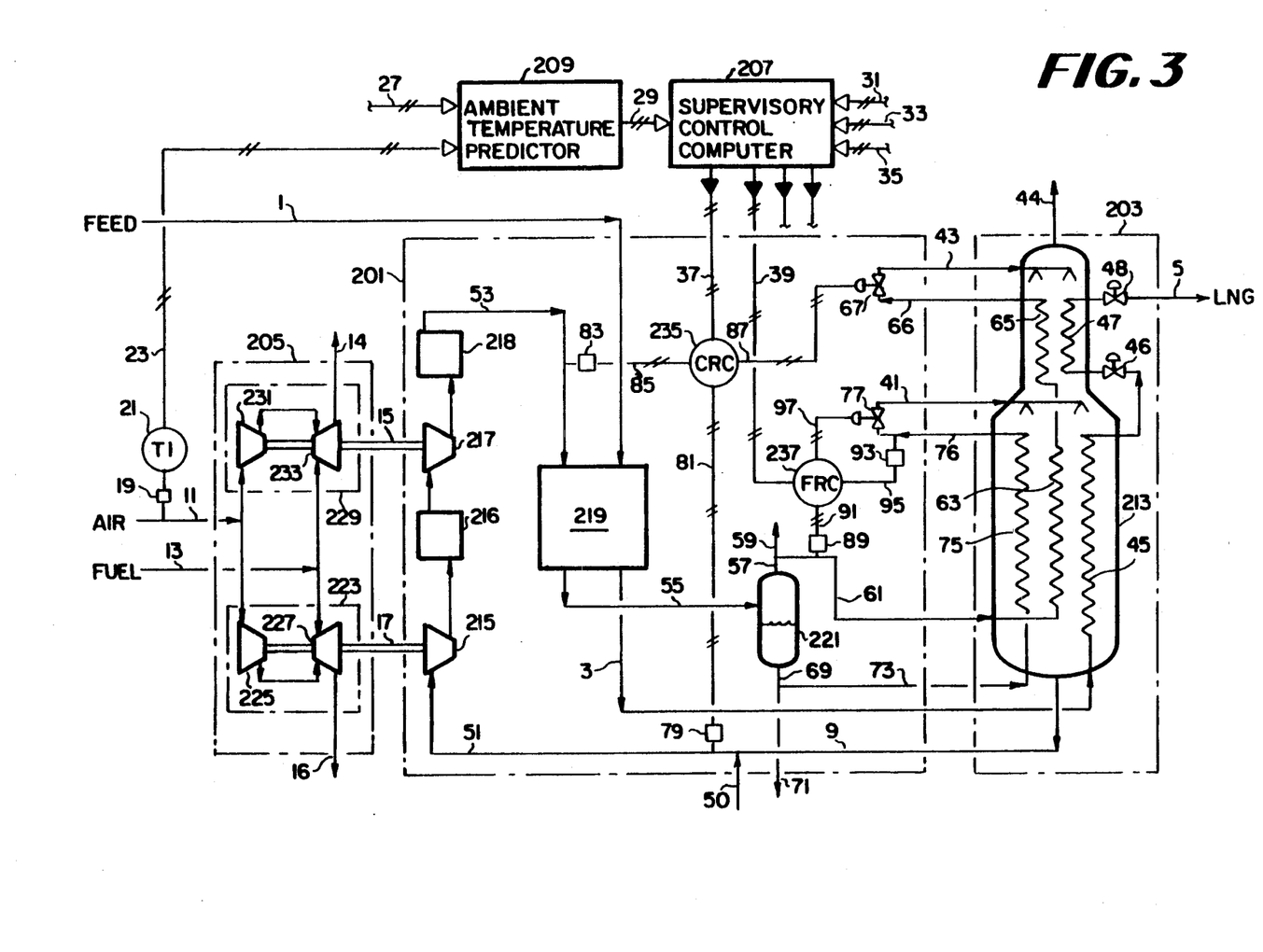
FIG. 3 is a more detailed flowsheet for the process of the present invention.

It has been found in the present invention that feedforward control of the gas liquefaction process is best achieved by regularly changing the set points of two critical feedback control loops within refrigeration system 201, namely (1) the feedback loop which controls the compression ratio across the mixed refrigerant compressors in refrigerant system 201 and (2) the feedback loop which controls the ratio of vapor refrigerant flow to liquid refrigerant flow from refrigeration system 201 to gas liquefaction system 203. The preferred embodiment of the present invention is illustrated by the schematic flowsheet of FIG. 3 which is a detailed version of the simplified block diagram of FIG. 1. Referring now to FIG. 3, pressurized and dried feed gas stream 1, preferably natural gas, flows into refrigeration system 201 in which the feedstream is cooled in cooling zone 219 by indirect heat exchange against a first vaporizing refrigerant provided by a closed loop refrigeration system of a type known in the art; one such system is described in FIG. 1 of earlier-cited U.S. Pat. No. 4,809,154. A similar system is described in U.S. Pat. No. 3,763,658 which is incorporated herein by reference. Refrigerants for this system can be selected from ammonia, nitrogen, methane, ethane, ethylene, propane, propylene, butane, and mixtures thereof. Cooled feed gas stream 3 between about −10° F. and −80° F. flows into main liquefaction exchanger 213 which is part of gas liquefaction system 203. The cooled feed gas is further cooled, liquefied, and subcooled in coil 45 by indirect heat exchange with vaporizing refrigerant streams 41 and 43 flowing downward in main exchanger 213. The resulting liquefied gas is expanded across valve 46, and is further cooled in coil 47 by indirect heat exchange with vaporizing refrigerant stream 43. The subcooled stream from coil 47 is expanded across valve 48 to yield LNG product stream 5 at about −255° to −265° F. and about 0.5 to 5 psig. Optionally, expansion can be accomplished by a turboexpander rather than valve 48.

Refrigeration for main liquefaction exchanger 213 is provided by a closed-loop refrigeration system 201 which contains a multicomponent refrigerant (MCR) having a selected composition comprising components selected from nitrogen, methane, ethane, ethylene, propane, propylene, and butane. The specific MCR compositions are selected to yield the optimum cooling curve in main exchanger 213. Vaporized MCR is withdrawn from exchanger 213 through line 9, refrigerant makeup is added if needed through line 50 or alternately as liquid directly to separator 221, and the total refrigerant vapor is returned through line 51 to first stage compressor 215, is compressed in first stage centrifugal compressor 215, cooled in intercooler 216, further compressed in second stage centrifugal compressor 217, and is finally cooled in aftercooler 21B. Alternately, compressor 215 and/or compressor 217 can be axial compressors. Intercooler 216 and aftercooler 21B can be water-cooled or air-cooled as is known in the art. Compressed MCR, now typically between 40° F. and 120° F. and between 400 and 800 psig, flows through line 53 into cooling zone 219 where it is cooled and partially liquefied at a temperature between about −10° and −80° F; flows into separator 221, and vapor stream 57 is withdrawn therefrom. Purge streams 44, 59, and/or 71 are optionally removed from the system while new refrigerant optionally is added via stream 50 and/or as liquid directly to separator 221 to adjust the MCR composition and inventory. The MCR vapor stream 61 then is cooled in cooling coils 63 and 65 of main liquefaction exchanger 213 to a temperature of about −220° to −265° F; is expanded across valve 67 which further cools the stream to about −225° to −275° F. Alternately, this expansion step can be accomplished by a turboexpander operating alone or in series with an expansion valve. The cooled refrigerant stream 43 flows into the top of main exchanger 213 and flows downward therein to provide refrigeration for cooling coils 47 and 65. Liquid refrigerant stream 69 is withdrawn from separator 221, a purge stream 71 is withdrawn therefrom if necessary, and liquid refrigerant stream 73 is returned to main exchanger 213. Stream 73 is further cooled in cooling coil 75, and is still further cooled by expansion across valve 77 to yield refrigerant stream 41 which flows downward in main exchanger 213 to provide refrigeration to the bottom section thereof. Alternately, this expansion step can be accomplished by a turboexpander operating alone or in series with an expansion valve.

Refrigerant compressors 215 and 217 are driven by gas turbine system 205 via shafts 15 and 17. The gas turbine system 205 comprises two gas turbines 223 and 229, which comprise respectively combustion air compressors 225 and 231, and expansion turbines 227 and 233. Alternately, compressors 215 and 217 can be driven by a common shaft of a single gas turbine. The gas turbine combustors are included as part of expansion turbines 227 and 233 in FIG. 3 and are not shown separately. Air stream 11 at ambient temperature splits to provide air to compressors 225 and 231, and fuel stream 13 splits to provide fuel to the combustor sections of expansion turbines 227 and 233. Combustion products exit the expansion turbines as exhaust streams 14 and 16. Any appropriate fuel can be used in the gas turbine system in an LNG plant the fuel is typically a portion of the feed gas or flash gas from the LNG product.

The feedforward control system which comprises ambient air temperature measurement/transmission elements 19, 21, and 23, ambient temperature predictor 209, and supervisory control computer 207 is identical to that described earlier in the discussion of FIG. 1. The feedforward control system in the preferred embodiment of FIG. 3 controls the liquefaction process at the desired optimum conditions by changing the set points of two key feedback control loops in refrigeration system 201. The first of these key feedback loops controls the compression ratio across mixed refrigerant compressors 215 and 217 as follows. The pressure of mixed refrigerant stream 51 at the inlet to compressor 215 is determined by pressure measurement/transmitter device 79 and sent as representative signal 81 to compression ratio controller 235. The pressure of mixed refrigerant stream 53 at the outlet of aftercooler 218 is determined by pressure measurement/transmitter device 83 and is sent as representative signal 85 to compression ratio controller 235. This feedback controller determines the compression ratio by dividing signal 85 by signal 81 and compares this ratio to the controller set point at a given time for a given ambient air temperature; if there is a deviation between the measured ratio and the set point, the controller sends a corrective signal 87 to increase or decrease the degree of opening of control valve 67 by means of a valve positioner to control the pressure drop of stream 66 at a valve sufficient to maintain the compression ratio at the desired set point. Optionally, a turboexpander can be used to reduce the pressure of stream 66. In this option, the turboexpander speed is controlled by signal 87 from feedback controller 235 by appropriate manipulative means to yield the required pressure ratio between streams 51 and 53.

The second key feedback loop controls the flow ratio of vapor refrigerant stream 61 to liquid refrigerant liquid stream 76 as follows. The flow rate of vapor refrigerant stream 61 at the inlet to main heat exchanger 213 is determined by flow measurement/transmitter device 89 and is sent as representative signal 91 to flow ratio controller 237. The flow rate of liquid refrigerant stream 76 after cooling in main exchanger 213 is determined by flow measurement/transmitter device 93 and is sent as representative signal 95 to flow ratio controller 237. This feedback controller determines the flow ratio by dividing signal 93 by signal 95 and compares this ratio to the controller set point at a given time for a given ambient air temperature; If there is a deviation between the measured ratio and the set point, the controller sends a corrective signal 97 to increase or decrease the degree of opening of control valve 77 by means of a valve positioner which is sufficient to maintain the desired flow ratio set point. Optionally, a turboexpander can be used to reduce the pressure of stream 76. In this option, the turboexpander speed is controlled by signal 97 from feedback controller 237 by appropriate manipulative means to yield the required flow ratio between streams 61 and 76.

These two key feedback control loops, which typically operate in conjunction with one or more additional feedback control loops, maintain steady state operation of the liquefaction process at the desired optimum conditions for a constant ambient air temperature.

In order to optimize the liquefaction process performance at a constant gas turbine exhaust temperature when the ambient air temperature is changing, the feedforward control system of the present invention is operated in the following manner. First, the ambient temperature at a future time is predicted by ambient temperature predictor 209 as earlier described. Multiplexed signal 29, representative of the current and predicted ambient temperatures, is fed to supervisory control computer 207 along with representative signals 31, 33, and 35 which are representative of key process variables required by supervisory control computer 207. Signals 31, 33, and 35 shown in FIG. 3 are representative of a larger number of process variables (in the form of signals proportional thereto) which are actually required by supervisory control computer 207 to carry out the process computations required for feedforward control by methods known in the process control art. In one mode of operation as earlier discussed, supervisory control computer 207 utilizes the measured process variables in a dynamic process model of the liquefaction process to determine new set points for the key feedback control loops in anticipation of the predicted ambient air temperature. In the present invention, supervisory control computer 207 determines a net set point for compression ratio controller 235 in anticipation of the future ambient air temperature and transmits signal 37 to compression ratio controller 235 which changes the current set point to the new set point. In like manner, supervisory control computer 207 determines a new set point for flow ratio controller 237 in anticipation of the future ambient air temperature and transmits signal 39 to flow ratio controller 237 which changes the current set point to the new set point. These feedforward control actions are repeated at appropriate time intervals as earlier discussed. The present invention thus enables operation of the liquefaction process at optimum conditions even though the ambient air temperature changes with time. The optimum conditions can be selected to minimize the specific fuel consumption required to liquefy the feed gas, or alternately to maximize the liquid production rate while using the lowest possible specific fuel consumption at that liquid production rate.

An additional and optional method of feedforward control for anticipating changes in ambient air temperature is to control the composition of circulating mixed refrigerant stream 51 of FIG. 3 and the inventory of refrigerant in the system. Since the overall efficiency of the liquefaction process depends in part upon the heat transfer efficiency in main heat exchanger 213, it is important to control the refrigerant composition and inventory so that the heat transfer efficiency in exchanger 213 is maximized. The composition and inventory of the refrigerant can be changed as necessary by adding a controlled amount and composition of makeup refrigerant via stream 50 or by adding makeup liquid directly to separator 221 of FIG. 3 while purging refrigerant in a controlled amount via streams 44, 59, or 71 or combinations thereof. When a decrease in overall liquefaction plant efficiency is anticipated due to a predicted increase in the ambient air temperature, the composition of refrigerant stream 51 and/or the inventory of refrigerant in the system can be changed in a feedforward control mode to ensure maximum operating efficiency. This control method would be used in addition to the feedforward control described above in which set points on the compression ratio feedback controller 235 and the vapor/liquid flow ratio feedback controller 237 are changed at regular time intervals by supervisory control computer 207 in anticipation of a predicted ambient air temperature. The dynamic process model in supervisory control computer 207 is used to determine the optimum refrigerant composition and inventory as well as the optimum set points for feedback controllers 235 and 237 in anticipation of the ambient air temperature at a future time. Once the optimum refrigerant composition and inventory are determined for the selected future time, changes to the composition and inventory can be made by appropriate automatic control of the flow and composition of stream 50 and the flows of streams 49, 59 71, or by manual changes of these stream properties by the plant operators.

EXAMPLE 1

The LNG process of FIG. 3 was simulated at two ambient temperatures at steady state conditions (without the use of feedforward control) to illustrate the effect of ambient temperature on process performance. Refrigeration system 219 was a closed-loop propane refrigeration system. The process was first simulated at an ambient temperature of 31° C. to determine the steady-state operating conditions. The same system was then simulated at an ambient temperature of 19° C. to determine the resulting new steady-state operating conditions. A number of specific operating parameters were held essentially constant for both of these ambient temperature conditions; multicomponent refrigerant (MCR) inventory, temperature difference at the warm end of main exchanger 213 (difference between stream 9 and stream 61 or 73), and the temperature of cooled feed gas stream 3. The other operating conditions were allowed to reach their respective steady state conditions thus reflecting the differences in ambient temperature.

Results of the simulations are compared in Table 1. As a result of the increase in ambient temperature, the LNG production rate drops by about 6% while the refrigerant compressor horsepower required for that production rate increases by 3.3%. As a result, the specific power increases by 10.3%.

TABLE 1

Effect of Ambient Air Temperature on LNG Process Performance

| | Ambient Air Temperature, °C. | |
|---|---|---|
| | 31 | 19 |
| LNG Production, $10^3$ lbmoles/hr | 34.4 | 36.6 |
| Liquid Level, Separator 221 (FIG. 3), % | 50 | 46.5 |
| MCR Composition, mole % | | |
| Nitrogen | 0.6 | 0.6 |
| Methane | 44.2 | 44.1 |
| Ethane | 39.9 | 40.1 |
| Propane | 15.3 | 15.2 |
| Suction Pressure, Compressor 215 (FIG. 3), psia | 45 | 45.5 |
| Discharge Pressure, Compressor 217 (FIG. 3) | 690 | 698 |
| Polytropic Efficiency, % | | |
| Low Pressure MCR Compressor 215 (FIG. 3) | 81.4 | 77.5 |
| High Pressure MCR Compressor 217 (FIG. 3) | 80.0 | 79.2 |
| Compressor Power, $10^3$ HP | | |
| Low Pressure MCR | 31.2 | 33.9 |
| High Pressure MCR | 27.8 | 30.8 |
| Low Pressure Propane* | 24.8 | 23.9 |
| High Pressure Propane* | 26.7 | 18.4 |
| Total | 110.6 | 107.0 |
| Specific Power, HP/(lbmole/hr) | 3.22 | 2.92 |

*Cooling Zone 219, FIG. 3

EXAMPLE 3

In order to illustrate the operation of the second mode feedforward control system described earlier, process conditions are estimated for the process of FIG. 3 operating at steady state conditions at several representative MCR inventories for ambient site air temperature of 20°, 25°, and 30° C. At each set of conditions, a typical overall compression ratio across refrigerant compressors 215 and 217 and a flow ratio of refrigerant stream 61 to refrigerant stream 73 required to minimize specific power (in brake horsepower per million standard cubic feet/day—BHP/MMSCFD) are estimated and tabulated for a constant gas turbine exhaust temperature (Table 2) and a constant compressor speed of 4500 RPM (Table 3 ). Tabular data similar to that illustrated in Table 2 would be entered into supervisory control computer 207 for use in the second mode of operation described earlier.

TABLE 2

Representative Optimum LNG Process Operating Parameters at Constant Gas Turbine Exhaust Temperature

| MCR Inventory, lbs × $10^{-3}$ | | Ambient Air Temp., °C. | Minimum Specific Power, BHP/ MMSCFD | Conditions Required for Minimum Specific Power | |
|---|---|---|---|---|---|
| | | | | Compression Ratio | Refrigerant Flow Ratio |
| $N_2$ | 1.4 | 20 | 360 | 15.0 | 8.00 |
| $C_1$ | 49.3 | | | | |
| $C_2$ | 78.9 | 25 | 363 | 14.0 | 8.25 |
| $C_3$ | 44.9 | | | | |
| | | 30 | 367 | 13.2 | 8.60 |
| $N_2$ | 1.6 | 20 | 358 | 16.0 | 8.5 |
| $C_1$ | 45.0 | | | | |
| $C_2$ | 75.0 | 25 | 360 | 15.2 | 8.7 |
| $C_3$ | 42.0 | | | | |
| | | 30 | 363 | 14.9 | 9.0 |
| $N_2$ | 1.8 | 20 | 356 | 16.3 | 8.3 |
| $C_1$ | 41.0 | | | | |
| $C_2$ | 72.0 | 25 | 359 | 15.2 | 8.5 |
| $C_3$ | 40.0 | | | | |

TABLE 2-continued

Representative Optimum LNG Process Operating Parameters at Constant Gas Turbine Exhaust Temperature

| MCR Inventory, lbs × 10$^{-3}$ | Ambient Air Temp., °C. | Minimum Specific Power, BHP/ MMSCFD | Conditions Required for Minimum Specific Power | |
|---|---|---|---|---|
| | | | Compression Ratio | Refrigerant Flow Ratio |
| | 30 | 362 | 14.7 | 8.9 |

TABLE 3

Representative Optimum LNG Process Operating Parameters at Constant Refrigerant Compressor Speed

| MCR Inventory, lbs × 10$^{-3}$ | | Ambient Air Temp., °C. | Minimum Specific Power, BHP/ MMSCFD | Conditions Required for Minimum Specific Power | |
|---|---|---|---|---|---|
| | | | | Compression Ratio | Refrigerant Flow Ratio |
| $N_2$ | 10.0 | 20 | 358 | 13.0 | 7.5 |
| $C_1$ | 30.0 | | | | |
| $C_2$ | 35.0 | 25 | 361 | 12.7 | 8.1 |
| $C_3$ | 5.0 | | | | |
| | | 30 | 364 | 12.5 | 6.5 |
| $N_2$ | 9.0 | 20 | 348 | 16.0 | 7.7 |
| $C_1$ | 25.0 | | | | |
| $C_2$ | 40.0 | 25 | 352 | 15.2 | 9.0 |
| $C_3$ | 8.0 | | | | |
| | | 30 | 356 | 14.9 | 7.1 |
| $N_2$ | 8.0 | 20 | 346 | 16.3 | 8.0 |
| $C_1$ | 30.0 | | | | |
| $C_2$ | 45.0 | 25 | 350 | 15.2 | 9.3 |
| $C_3$ | 10.0 | | | | |
| | | 30 | 354 | 14.7 | 7.7 |

In the second mode of feedforward control as earlier discussed, tabular data similar to Tables 2 and 3 are stored in supervisory control computer 207. At each time interval, supervisory control computer 207 accesses the appropriate refrigeration system pressures, temperatures, liquid levels, and compositions as representative signals 31, 33, and 35 and calculates the MCR inventory. The ambient air temperature is predicted as earlier discussed, and is transmitted as signal 29 to supervisory control computer 207, which then determines by interpolation of the appropriate tabular data the compression ratio and refrigerant ratio required to achieve the minimum specific fuel consumption, determines from these ratios the corresponding new set points of compression ratio controller 235 and flow ratio controller 237 respectively, determines and transmits representative signals 37 and 39 respectively which reset the set points of the two controllers in anticipation of the predicted ambient air temperature. In this mode of operation, the feedforward control system anticipates and compensates for the effects of ambient air temperature changes, thereby optimizing LNG plant performance by minimizing specific fuel consumption.

Thus the embodiment of the present invention comprise new and useful methods for operating a natural gas liquefaction process having one or more gas turbine-driven refrigeration compressors by utilizing a feedforward control system which anticipates changes in ambient air temperature and resets the set points of one or more feedback controllers to minimize the specific fuel consumption at a given liquid production rate. Specific fuel consumption for such a process cannot be minimized by the use of fixed set point feedback controllers if ambient air temperatures vary; the present invention offers an efficient and practical method to reset the set points of such feedback controllers and thereby allow minimization of specific fuel consumption at a given liquid production rate.

The essential characteristics of the present invention are described fully and completely in the foregoing disclosure. One skilled in the art can understand the invention and make various changes and modifications thereto without departing from the basic spirit thereof and without departing from the scope and range of equivalents of the claims which follow.

We claim:

1. A method of operating a gas liquefaction process wherein a feed gas is liquefied by indirect heat exchange with at least one refrigerant provided by a refrigeration system which utilizes at least one gas turbine-driven compressor, wherein said refrigeration system utilizes at least one feedback control system, said method comprising:
   (a) determining the ambient air temperature at the location of said liquefaction process at a given time;
   (b) determining the optimum operating conditions of said liquefaction process including the set point of said feedback control system at said given time, and operating said liquefaction process at said optimum operating conditions including said set point,
   (c) predicting said ambient air temperature at a future time;
   (d) determining new optimum operating conditions of said liquefaction process including a new set point of said feedback control system at said future time, and changing said optimum operating conditions to said new optimum operating conditions including changing said set point to said new set point;
   (e) operating said liquefaction process at said new optimum operating conditions including said new set point; and
   (f) repeating steps (a), (c), (d), and (e) at a time interval defined by the time difference between said given time and said future time; thereby providing a feedforward control method for the operation of said liquefaction process which anticipates changes in ambient air temperature in order to maintain optimum operating conditions for said process.

2. The method of claim 1 wherein said optimum operating conditions minimize the specific fuel consumption to liquefy said feed gas.

3. The method of claim 1 wherein said optimum operating conditions maintain a given liquefaction rate of said feed gas while minimizing the specific fuel consumption at said given liquefaction rate.

4. The method of claim 3 wherein said optimum operating conditions include the optimum composition and inventory of said refrigerant in said refrigeration system.

5. A method of operating a gas liquefaction process in which at least a portion of the refrigeration required to liquefy said gas is provided by a refrigeration system utilizing one or more gas turbine-driven compressors, said method comprising:
   (a) compressing, cooling, and partially liquefying a refrigerant stream, said compression being accomplished at least in part by a gas turbine-driven compressor;
   (b) separating the resulting partially liquefied refrigerant stream of step (a) into a vapor refrigerant stream and a liquid refrigerant stream;
   (c) cooling said vapor refrigerant stream and expanding the resulting cooled vapor refrigerant stream, thereby reducing the pressure and temperature of said stream, whereby the resulting stream is at least partially liquefied, (d) vaporizing the resulting refrigerant stream of step (c) by indirect heat exchange with a precooled feed gas, thereby providing a portion of the refrigeration needed to liquefy said feed gas; and (e) returning the resulting vaporized refrigerant stream of step (d) to said gas turbine-driven compressor and repeating steps (a) through (e), and during the cyclic operation of steps (a) through (e) performing the additional steps of:

(f) controlling the pressure drop resulting from the expansion of said cooled vapor refrigerant stream in step (c) at a set value such that the compression ratio of said gas turbine-driven compressor is maintained at a selected value which optimizes the operation of said gas liquefaction process at an ambient air temperature at a given time;

(g) predicting an ambient air temperature at a future time;

(h) determining a new compression ratio for said gas turbine-driven compressor which would be required to optimize the operation of said gas liquefaction process at the ambient air temperature at said future time;

(i) changing the pressure drop of said cooled vapor refrigerant stream in step (c) in anticipation of the ambient temperature at said future time from said set value to a new value which is sufficient to yield said new compression ratio; and (j) repeating steps (f) through (i) at a time interval defined by the difference between said given time and said future time; thereby providing a feedforward control method for the operation of said liquefaction process which anticipates the ambient temperature at said future time in order to maintain optimum operating conditions for said process.

6. The method of claim 5 wherein said optimum operating conditions minimize the specific fuel consumption to liquefy said feed gas.

7. The method of claim 5 wherein said optimum operating conditions maintain a given liquefaction rate of said feed gas while minimizing the specific fuel consumption at said given liquefaction rate.

8. The method of claim 5 further comprising:

(k) further cooling said liquid refrigerant stream and expanding the resulting cooled liquid refrigerant stream, thereby reducing the pressure and temperature of said stream;

(l) vaporizing said future cooled liquid refrigerant stream in indirect heat exchange with said precooled feed gas in a liquefaction exchanger, thereby providing additional refrigeration to liquefy said feed gas;

(m) withdrawing the resulting vaporized refrigerant stream from said liquefaction exchanger and returning the stream to said gas turbine-driven compressor, and repeating steps (k), (l), and (m), said steps further defining a continuous closed-loop refrigeration process; and during the cyclic operation of said continuous closed-loop refrigeration process, and simultaneously with steps (f) through (j), performing the additional steps of:

(n) controlling the mass flow ratio of said further cooled liquid refrigerant stream to said vapor refrigerant stream at a set value such that said compression ratio of said gas turbine-driven compressor is maintained at said selected value which minimizes the specific fuel consumption required to liquefy said feed gas at the ambient air temperature at said given time;

(o) determining a new mass flow ratio of said further cooled liquid refrigerant stream to said vapor refrigerant stream which would be required to maintain said new compression ratio at said ambient air temperature at said future time;

(p) changing said mass flow ratio in anticipation of the ambient temperature at said future time from said set value to a new value which is sufficient to yield said new compression ratio; and (q) repeating steps (n) through (p) at a time interval defined by the difference between said given time and said future time; thereby providing a feedforward control method for the operation of said liquefaction process which anticipates said ambient temperature at said future time in order to maintain optimum operating conditions for said process.

9. The method of claim 8 wherein said optimum operating conditions minimize the specific fuel consumption to liquefy said feed gas.

10. The method of claim 8 wherein said optimum operating conditions maintain a given liquefaction rate of said feed gas while minimizing the specific fuel consumption at said given liquefaction rate.

11. The method of claim 8 wherein said expanding of the resulting cooled vapor refrigerant stream is accomplished at least in part by a throttling valve and wherein said pressure reduction is controlled at said set value by:

(1) measuring the pressure of said resulting vaporized refrigerant stream which is the feed to said gas turbine-driven compressor and generating a first signal representative of said pressure;

(2) measuring the pressure of the discharge from said gas turbine-driven compressor and generating a second signal representative of said pressure; and (3) dividing said second signal by said first signal to yield a third signal representative of said compression ratio, and utilizing said third signal to control the degree of opening of said throttling valve at an opening sufficient to achieve said set value of pressure reduction, wherein said degree of opening is achieved by means of a first feedback controller which compares said third signal with a given set point and changes said degree of opening to maintain said set point.

12. The method of claim 11 wherein said expanding of the resulting cooled liquid refrigerant stream is accomplished at least in part by a throttling valve and wherein said pressure reduction is controlled at said set value by:

(4) measuring the mass flow rate of said further cooled liquid refrigerant stream and generating a fourth signal representative of said flow rate;

(5) measuring the mass flow rate of said vapor refrigerant stream and generating a fifth signal representative of said flow rate; and (6) dividing said fourth signal by said fifth signal to yield a sixth signal representative of said mass flow ratio, and utilizing said sixth signal to control the degree of opening of said throttling valve at an opening sufficient to achieve said set value of pressure reduction, wherein said degree of opening is achieved by means of a second feedback controller which compares said sixth signal with a given set point and changes said degree of opening to maintain said set point.

13. The method of claim 12 wherein said pressure reduction across said first throttling valve and said pressure reduction across said second throttling valve are changed to said new values in anticipation of the ambient air temperature at said future time by utilizing a supervisory control computing system and executing the steps of:

(7) measuring the appropriate temperatures, pressures, liquid levels, and compositions of the refrigerant in said closed-loop refrigeration process at said given time, converting the measurements to the corresponding appropriate signals, and transmitting said signals to said supervisory control computing system;

(8) utilizing the signals of step (7) to calculate the refrigerant composition and inventory in said closed-loop refrigeration process;

(9) determining the new values of pressure reduction across said first and said second throttling valves required at said future time to minimize the specific fuel consumption to liquefy said feed gas;

(10) determining the new set points of said first and second feedback controllers which are required at said future time to yield said pressure reduction across said first throttling valve and said second throttling valve, sand generating a seventh signal and an eighth signal proportional to said new set points respectively, wherein steps (8), (9) and (10) are carried out by said supervisory control computing system in real time;

(11) utilizing said seventh signal to reset the set point of said first feedback controller to said new set point to yield said new value of pressure reduction across said first throttling valve;

(12) utilizing said eighth signal to reset the set point of said second feedback controller to said new set point to yield said new value of pressure reduction across said second throttling valve; and (13) repeating steps (g), (h), (i), (n), (o), and (7) through (12) regularly at a feedforward control time interval defined as the interval between said given time and said future time.

14. The method of claim 13 wherein said new values of pressure reduction are determined by simulation of the operation of said gas liquefaction process at the predicted ambient temperature at said future time utilizing the refrigerant inventory of step (8), said simulation being carried out by said supervisory control computing system in real time.

15. The method of claim 13 wherein said new values of pressure reduction are determined by accessing stored data in said supervisory control computing system in which said stored data comprise values of pressure reduction across said first and second throttling valves and the corresponding set points of said first and second throttling valves required to minimize the specific fuel consumption of said liquefaction process at each of a series of ambient temperatures for each of a number of refrigerant inventories, said data being obtained previously by steady state simulations of said liquefaction process at each ambient temperatures and refrigerant composition and inventory for the range of anticipated operating conditions of said liquefaction process or by analysis of actual plant operating data for said gas liquefaction process.

16. The method of claim 8 wherein said expanding of the resulting cooled vapor refrigerant stream is accomplished at least in part by a turboexpander and wherein said pressure reduction is controlled at said set value by:

(1) measuring the pressure of said resulting vaporized refrigerant stream which is the feed to said gas turbine-driven compressor and generating a first signal representative of said pressure;

(2) measuring the pressure of the discharge from said gas turbine-driven compressor and generating a second signal representative of said pressure; and (3) dividing said second signal by said first signal to yield a third signal representative of said compression ratio, and utilizing said third signal to control said turboexpander to achieve said set value of pressure reduction, wherein said control achieved by means of a first feedback controller which compares said third signal with a given set point and changes said speed to maintain said set point.

17. The method of claim 16 wherein expanding of the resulting cooled liquid refrigerant stream is accomplished at least in part by a turboexpander and wherein said pressure reduction is controlled at said set value by:

(4) measuring the mass flow rate of said further cooled liquid refrigerant stream and generating a fourth signal representative of said flow rate;

(5) measuring the mass flow rate of said vapor refrigerant stream and generating a fifth signal representative of said flow rate; and (6) dividing said fourth signal by said fifth signal to yield a sixth signal representative of said mass flow ratio, and utilizing said sixth signal to control said turboexpander at a speed sufficient to achieve said set value of pressure reduction, wherein said speed is controlled by means of a second feedback controller which compares said sixth signal with a given set point and changes said speed to maintain said set point.

18. The method of claim 8 wherein said refrigerant stream in said closed-loop refrigeration process comprises one or more components selected from the group consisting of nitrogen, methane, ethane, ethylene, propane, propylene, butane and mixtures thereof.

19. The method of claim 8 wherein said cooling of said refrigerant stream after compression by said gas turbine-driven compressor is provided at least in part by indirect heat exchange with an additional vaporizing refrigerant stream from an additional closed-loop refrigeration process.

20. The method of claim 19 wherein said precooled feed gas is obtained by cooling an ambient temperature feed gas by indirect heat exchange with said additional vaporizing refrigerant stream.

21. The method of claim 19 wherein said additional closed-loop refrigeration process utilizes at least one gas turbine-driven compressor.

22. The method of claim 19 wherein said additional vaporizing refrigerant stream comprises one or more components selected from the group consisting of ammonia, nitrogen, methane, ethane, ethylene, propane, propylene, butane, and mixtures thereof.

23. The method of claim 8 wherein said feed gas is natural gas comprising methane.

24. The method of claim 8 wherein said gas turbine-driven compressor comprises at least two stages of compression with intercooling and/or aftercooling provided at least in part by indirect heat exchange with ambient air.

25. The method of claim 8 wherein the gas turbine of said gas turbine-driven compressor is operated at a constant turbine exhaust temperature.

26. The method of claim 8 wherein said gas turbine of gas turbine-driven compressor is operated at a constant turbine rotor speed.

27. The method of claim 8 wherein the ambient air temperature at said future time is predicted from a daily weather forecast for a site at which said liquefaction process is operated.

28. The method of claim 8 wherein the ambient air temperature at said future time is predicted by the extrapolation of regularly repeated ambient air temperature measurements made prior to and at said given time, said measurements being made at a site at which said liquefaction process is operated.

29. A system for gas liquefaction comprising:
  (a) indirect heat exchange means for liquefying a precooled gas feedstream against a first and a second vaporizing refrigerant stream;
  (b) closed-loop refrigeration means for providing said first and second vaporizing refrigerant streams to said indirect heat exchange means and for removing the resulting vaporized refrigerant therefrom; wherein said closed-loop refrigeration means comprises:
    (1) compression means comprising at least one gas turbine-driven compressor followed by aftercooling means, first conduit means for transferring said vaporized refrigerant from said indirect heat exchange means to said compression means, and second conduit means for the flow of compressed vaporized refrigerant from said compression means;
    (2) first cooling means for cooling and partially liquefying said compressed vaporized refrigerant which is transferred from said compression means to said cooling means by said second conduit means;
    (3) separator means for separating partially liquefied refrigerant from said first cooling means, said separator means comprising a separation vessel, third conduit means for transferring partially liquefied refrigerant from said first cooling means to said separator means, and fourth and fifth conduit means for transporting a vapor refrigerant stream and a liquid refrigerant stream respectively from said separator means to said indirect heat exchange means;
  (c) second cooling means within said indirect heat exchange means for further cooling said vapor refrigerant stream, and sixth conduit means for withdrawing a further cooled vapor refrigerant stream from said second cooling means;
  (d) first expansion means for reducing the pressure of said further cooled vapor refrigerant stream thereby further cooling the strea, and seventh conduit means for transferring the stream from said first expansion means into said indirect heat exchange means to provide said first vaporizing refrigerant stream;
  (e) third cooling means within said indirect heat exchange means for further cooling said liquid refrigerant stream, and eighth conduit means for withdrawing a further cooled liquid refrigerant stream from said third cooling means;
  (f) second expansion means for reducing the pressure of said further cooled liquid refrigerant stream thereby further cooling the stream, and ninth conduit means for transferring the stream from said second expansion means into said indirect heat exchange means to provide said second vaporizing refrigerant stream;
  (g) first feedback control means for controlling the degree of pressure reduction across said first expansion means according to a first set point;
  (h) first pressure measurement and transmitter means for measuring the pressure in said first conduit means and transmitting a first signal representative of said pressure to said first feedback control means;
  (i) second pressure measurement and transmitter means for measuring the pressure in said second conduit means and transmitting a second signal representative of said pressure to said first feedback control means;
  (j) second feedback control means for controlling the degree of pressure reduction across said second expansion means according to a second set point;
  (k) first flow measurement and transmitter means for measuring the flow in said fourth conduit means and transmitting a third signal representative of said flow to said second feedback control means;
  (l) second flow measurement and transmitter means for measuring the flow in said eighth conduit means and transmitting a fourth signal representative of said flow to said second feedback control means;
  (m) conduit means for introducing said precooled gas feedstream into said indirect heat exchange means, fourth cooling means within said indirect heat exchange means for liquefying said precooled gas feedstream, and conduit means to remove a liquefied gas product from said fourth cooling means;
  (n) supervisory control computing means comprising the capability to:
    (1) calculate the amount of refrigerant in said closed-loop refrigeration means at a given time;
    (2) predict the ambient temperature at a future time;
    (3) determine new values of said first and second set points required at said future time to cause the appropriate pressure reduction across said first and second expansion means such that the specific fuel consumption to liquefy said precooled gas feedstream is minimized; and
    (4) generate a fifth and a sixth signal representative of said new values of said first and second set points respectively;
  (o) process parameter measurement and transmission means for measuring appropriate process parameters and transmitting signals representative of said parameters from selected locations in said system to said supervisory control computing means;
  (p) transmission means to transmit said fifth signal to said first feedback control means and first manipulative means to change said first set point from its value at a given time to said new value; and
  (q) transmission means to transmit said sixth signal to said second feedback control means and second manipulative means to change said second set point from its value at a given time to said new value.

30. The system of claim 29 wherein said aftercooling means comprises indirect heat exchange means for cooling hot compressed refrigerant from said gas turbine-driven centrifugal compressor against ambient air.

31. The system of claim 29 wherein said first cooling means comprises a closed-loop refrigeration system and indirect heat exchanger for cooling and partially liquefying said compressed vaporized refrigerant against vaporizing refrigerant selected from the group consisting of ammonia, nitrogen, methane, ethane, ethylene, propane, propylene, butane, and mixtures thereof.

32. The system of claim 29 wherein said first expansion means comprises a throttling valve wherein the degree of pressure reduction is regulated by controlling the opening of said valve by a first valve positioning means.

33. The system of claim 29 wherein said second expansion means comprises a throttling valve wherein the degree of pressure reduction is regulated by controlling the opening of said valve by a second valve positioning means.

34. The system of claim 29 wherein said first expansion means comprises a turboexpander wherein the degree of pressure reduction is regulated by controlling the rotor speed of said turboexpander by a first operative means.

35. The system of claim 29 wherein said second expansion means comprises a turboexpander wherein the degree of pressure reduction is regulated by controlling the rotor speed of said turboexpander by a second operative means.

36. The system of claim 29 wherein said closed-loop refrigeration means contains a refrigerant comprising components selected from the group consisting of nitrogen, methane, ethane, ethylene, propane, propylene, butane and mixtures thereof.

* * * * *